US010887708B2

(12) United States Patent
Kataoka et al.

(10) Patent No.: US 10,887,708 B2
(45) Date of Patent: Jan. 5, 2021

(54) AUDIO SYSTEM AND POWER SUPPLY CIRCUIT

(71) Applicant: YAMAHA CORPORATION, Hamamatsu (JP)

(72) Inventors: Takuya Kataoka, Hamamatsu (JP); Hitoshi Shima, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/571,543

(22) Filed: Sep. 16, 2019

(65) Prior Publication Data

US 2020/0015026 A1 Jan. 9, 2020

Related U.S. Application Data

(63) Continuation of application No. PCT/JP2017/011842, filed on Mar. 23, 2017.

(51) Int. Cl.

| | |
|---|---|
| ***H04R 29/00*** | (2006.01) |
| ***H04R 3/00*** | (2006.01) |
| ***H02M 1/32*** | (2007.01) |
| ***H02M 7/04*** | (2006.01) |

(52) U.S. Cl.

CPC ............ *H04R 29/001* (2013.01); *H02M 1/32* (2013.01); *H02M 7/04* (2013.01); *H04R 3/00* (2013.01)

(58) Field of Classification Search

CPC ......... H04R 29/001; H04R 3/00; H02M 1/32; H02M 7/04

See application file for complete search history.

(56) References Cited

U.S. PATENT DOCUMENTS

| | | | | |
|---|---|---|---|---|
| 8,339,522 B2 * | 12/2012 | Urisu | G09G 3/3611 | 345/204 |
| 2007/0252917 A1 * | 11/2007 | Ohno | H03G 3/348 | 348/738 |
| 2009/0102550 A1 | 4/2009 | Ohama | | |

FOREIGN PATENT DOCUMENTS

| | | |
|---|---|---|
| JP | 2007132965 A | 5/2007 |
| JP | 2007288995 A | 11/2007 |
| JP | 2009141670 A | 6/2009 |
| JP | 2009159433 A | 7/2009 |
| JP | 2014007817 A | 1/2014 |
| WO | 2006132202 A1 | 12/2006 |

OTHER PUBLICATIONS

Translation of JP-2009141670-A,, Kajita (Year: 2009).*
Translation of JP-2007288995-A,, Kawaguchi (Year: 2007).*

(Continued)

*Primary Examiner* — Andrew L Sniezek

(74) *Attorney, Agent, or Firm* — Rossi, Kimms & McDowell LLP

(57) ABSTRACT

A power supply circuit supplies a direct current voltage to an audio processing device. The power supply circuit includes: a converting circuit configured to convert an alternating current voltage into a DC voltage; a detection circuit configured to detect a state in which the AC voltage lower than a threshold continues for a given period of time; and a notification circuit configured to, when the detection circuit detects the state representative of an AC voltage drop, notify the audio processing device of the AC voltage drop.

2 Claims, 6 Drawing Sheets

(56) References Cited

OTHER PUBLICATIONS

International Search Report issued in Intl. Appln. No. PCT/JP2017/011842 dated Jun. 13, 2017. English translation provided.
Written Opinion issued in Intl. Appln. No. PCT/JP2017/011842 dated Jun. 13, 2017.
Office Action issued in Japanese Appln. No. 2019-506853 dated Jun. 16, 2020. English machine translation provided.
Office Action issued in Japanese Application No. 2019-506853 dated Dec. 1, 2020. English translation provided.

* cited by examiner

SIGNAL SUPPLY DEVICE
12
X
A/D CONVERTOR
31
SIGNAL PROCESSOR
32
D/A CONVERTOR
33
30
POWER AMPLIFIER
34
Y
SWITCH
35
Y
SOUND OUTPUTTER
18
100
20
16
STORAGE CIRCUIT
24
SIGNAL PROCESSOR
22
D
F
POWER SUPPLY CIRCUIT
14
A
200

DC/DC CONVERTING CIRCUIT
CONSTANT VOLTAGE CIRCUIT
NOTIFICATION CIRCUIT
SIGNAL GENERATING CIRCUIT
COIL
OPT
OPT
OPT
D
F
S
S
S
V
A
Qa
Qb
N1
N2
R1
R2
14
40
41
42
43
44
45
46
47
48
51
52
53
54
60
61
62
64
65
200
621
622

AUDIO SYSTEM AND POWER SUPPLY CIRCUIT

This application is a Continuation Application of PCT Application No. PCT/JP2017/011842, filed Mar. 23, 2017, the entire contents of which are incorporated herein by reference.

BACKGROUND

Field of the Invention

The present invention relates to a power supply circuit that generates a direct current (DC) voltage from an alternating current (AC) voltage, and relates to an audio system.

Description of Related Art

There has been proposed a technology for executing various types of signal processing on an audio signal in related art. For example, Japanese Patent Application Laid-Open Publication No. 2009-159433 discloses an amplifier that amplifies an audio signal while preventing clipping. The amplification device operates using, for example, a DC voltage that a power supply circuit generates from an AC voltage of a commercial power supply.

There is a case in which a supply of power is unstable due to the supplier of the power. In this case, the unstable supply of power may cause a momentary sharp drop in an AC voltage for various reasons. When the AC voltage drops sharply momentarily, a DC voltage in the audio system also drops sharply and momentarily. However, an above-described conventional audio system cannot detect the drop of the DC voltage instantaneously. This may cause unpleasant noise in a sound played back based on an amplified audio signal.

SUMMARY

In consideration of the foregoing circumstances, an object of an aspect of the present invention is to suppress noise in an audio signal due to a sudden interruption of an AC voltage.

In order to solve the foregoing problem, a sound system according to a preferred aspect of the present invention includes: an audio processing device; and a power supply circuit configured to supply a direct current (DC) voltage to the audio processing device, in which the power supply circuit includes: a converting circuit configured to convert an alternating current (AC) voltage into the DC voltage; a detection circuit configured to detect a state in which the AC voltage lower than a threshold continues for a given period of time; and a notification circuit configured to, when the detection circuit detects the state representative of an AC voltage drop, notify the audio processing device of the AC voltage drop, and in which, when the audio processing device receives a notification regarding the AC voltage drop, the audio processing turns down a signal level of an audio signal to be output.

A power supply circuit according to a preferred aspect of the present invention is a power supply circuit that supplies a direct current (DC) voltage to an audio processing device, the power supply circuit includes: a converting circuit configured to convert an alternating current (AC) voltage into the DC voltage; a detection circuit configured to detect a state in which the AC voltage lower than a threshold continues for a given period of time; and a notification circuit configured to, when the detection circuit detects the state representative of an AC voltage drop, notify the audio processing device of the AC voltage drop.

DESCRIPTION OF THE EMBODIMENTS

Figure 1:
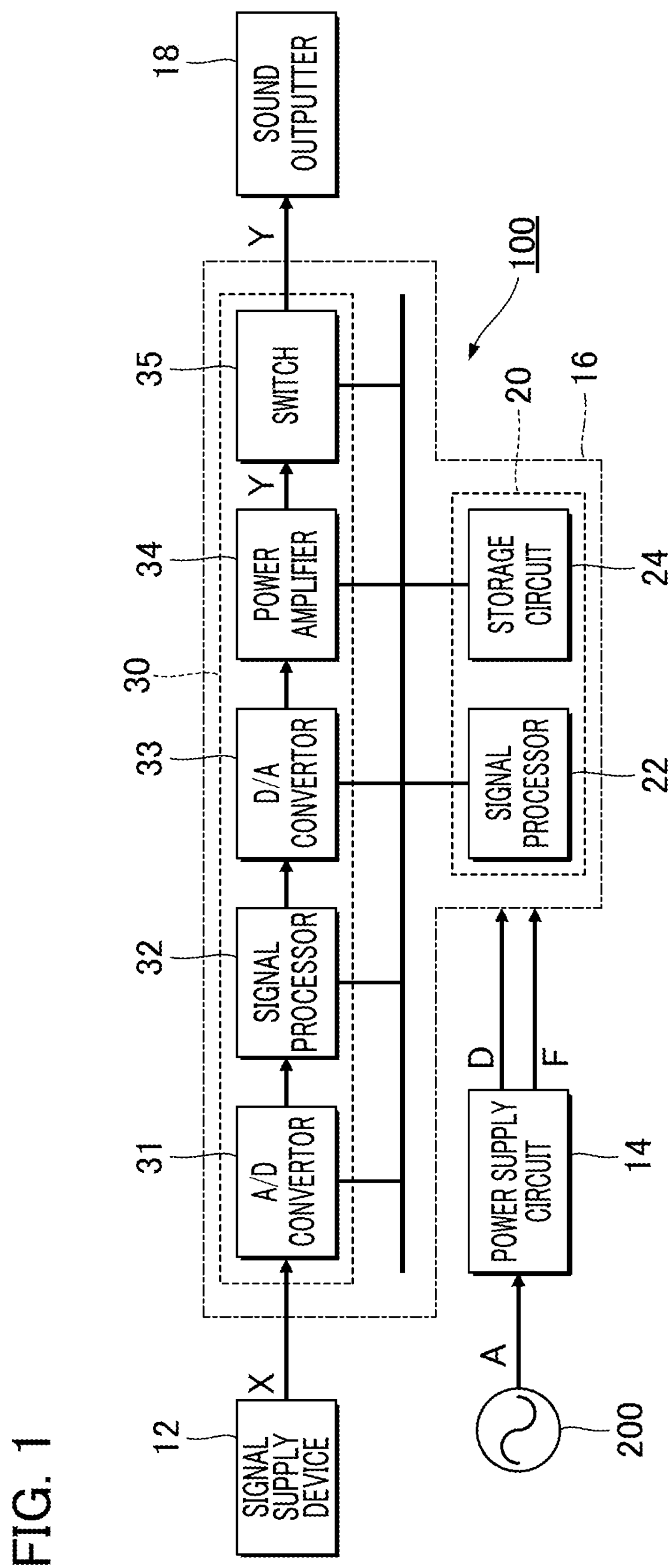
FIG. 1 is a configuration diagram of an audio system according to a preferred aspect of the present invention.

FIG. 1 is a block diagram of an audio system 100 according to a preferred embodiment of the present invention. As shown in FIG. 1, the audio system 100 is a computer system that reproduces various sounds such as musicals sounds or speech sounds. The audio system 100 includes a signal supply device 12, a power supply circuit 14, an audio processing device 16, and a sound outputter 18. Any two or more elements of the audio system 100 may be integrally configured. For example, the power supply circuit 14 may be mounted on the audio processing device 16.

The signal supply device 12 is a signal source that supplies an audio signal X representative of various sounds such as a voice sound or a musical sound to the audio processing device 16. Examples of the signal supply device 12 include a reproduction device that reads out the audio signal X from a portable or built-in recording medium. Examples of the signal supply device 12 also include a sound receiver that receives surrounding sound to generate the audio signal X corresponding to that sound, or a communication device that receives the audio signal X from another device via a communication network.

The power supply circuit 14 converts, for example, an AC voltage A supplied from a power supply 200 such as a commercial power supply into a DC voltage D. The audio processing device 16 operates using a DC voltage D that is supplied from the power supply circuit 14 as a supply voltage. The audio processing device 16 generates an audio signal Y by processing the audio signal X that is supplied from the signal supply device 12. The sound outputter 18 is, for example, a speaker or a headphone. The sound outputter 18 outputs the sound represented by the audio signal Y generated by the audio processing device 16.

As shown in FIG. 1, the audio processing device 16 includes a control unit 20 and a signal processing circuit 30. The control unit 20 includes a control processor 22 and a storage circuit 24. The control processor 22 is, for example, an arithmetic processing circuit such as a central processing unit (CPU). The control processor 22 controls the signal processing circuit 30 by executing a program stored in the storage circuit 24. The storage circuit 24 stores a program to be executed by the control processor 22 and various types of data to be used by the control processor 22. For example, there may be used, as the storage circuit 24, a known recording medium such as a semiconductor recording medium or a magnetic recording medium, or a combination of recording mediums of a plurality of types.

The DC voltage D from the power supply circuit 14 is supplied to the control unit 20 in the audio processing device 16 with priority over the other elements. In other words, when the power supply 200 comes into halt for any of various reasons, the one and only element that will operate last is the control unit 20 among all the elements of the audio processing device 16. When the AC voltage returns to normal, the element that will restart first is again the control unit 20. The signal processing circuit 30 includes a comparator circuit (not shown) provided on a power-supply line. The comparator circuit determines whether the voltage on the power-supply line has reached a given minimum voltage. In other words, the comparator circuit determines whether the power-supply line receives a supply of a necessary voltage for the signal processing circuit 30. The control processor 22 can obtain the comparison results from the comparing circuit.

The signal processing circuit 30 generates the audio signal Y by executing signal processing on the audio signal X under the control of the control unit 20. As shown in FIG. 1, the signal processing circuit 30 includes an A/D convertor 31, a signal processor 32, a D/A convertor 33, a power amplifier 34 and a switch 35.

The A/D convertor 31 converts the audio signal X supplied from the signal supply device 12 from an analog signal to a digital signal. The signal processor 32 is a digital signal processor (DSP) that executes various types of signal processing on the audio signal X converted by the A/D convertor 31. Examples of signal processing in the signal processor 32 include crossover processing for dividing the band width of the audio signal X into a plurality of bands, delay processing for delaying the audio signal X, equalizer processing for adjusting frequency characteristics of the audio signal X, limiter processing for limiting a voltage range of the audio signal X, or howling suppression processing to suppress howling.

The D/A convertor 33 converts the digital signal processed by the signal processor 32 into an analog audio signal. The power amplifier 34 amplifies the audio signal converted by the D/A convertor 33, to obtain an audio signal Y. For example, there may be used, as the power amplifier 34, various amplification circuits such as a class D amplifier.

The switch 35 includes, for example, a relay. The switch 35 switches a connection between the audio processing device 16 and the sound outputter 18 from an ON state to an OFF state, or vice versa. The ON state indicates that the audio processing device 16 and the sound outputter 18 are electrically connected to each other. The OFF state indicates that the audio processing device 16 and the sound outputter 18 are electrically isolated from each other. When the switch 35 is turned to the ON state, the sound outputter 18 receives a supply of the audio signal Y generated by the power amplifier 34. In contrast, when the switch 35 is turned to the OFF state, the sound outputter 18 does not receive the supply of the audio signal Y.

Figure 2:
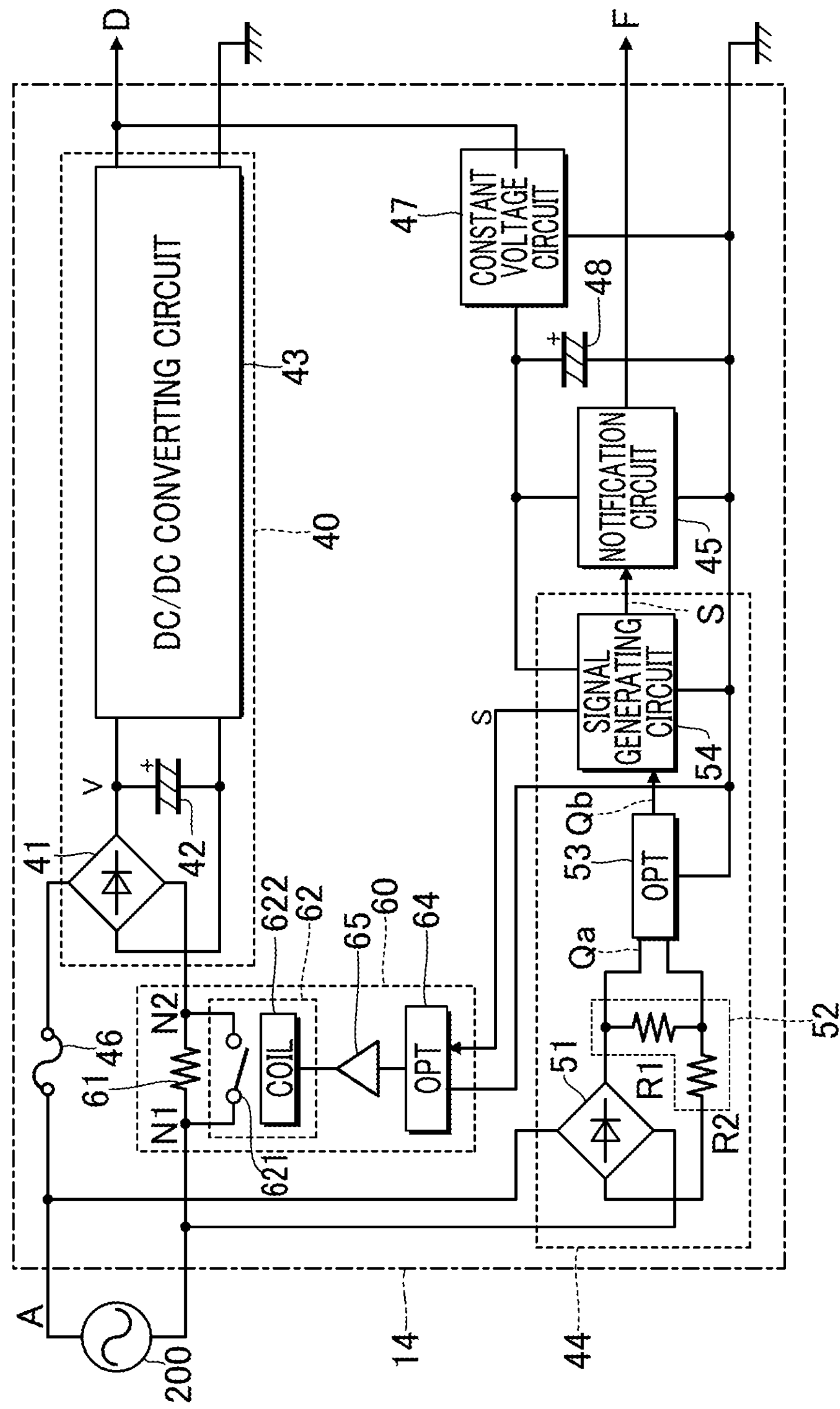
FIG. 2 is a configuration diagram of a power supply circuit.

FIG. 2 is a circuit diagram of the power supply circuit 14. As shown in FIG. 2, the power supply circuit 14 according to the embodiment includes an AC/DC converting circuit 40, a detection circuit 44, and notification circuit 45. The AC/DC converting circuit 40 converts the AC voltage A supplied from the power supply 200 into the DC voltage. The AC/DC converting circuit 40 according to the embodiment includes a rectifying circuit 41, a capacitor 42, and a DC/DC converting circuit 43.

The rectifying circuit 41 rectifies the AC voltage A supplied from the power supply 200. For example, there may be used, as the rectifying circuit 41, a bridge-type full-wave rectifying circuit that full-wave rectifies the AC voltage A. A fuse 46 is disposed between the power supply 200 and an input terminal of the rectifying circuit 41. The fuse 46 will be blown when the fuse 46 receives a supply of a current over the limit thereof. The capacitor 42 smooths the rectified voltage by the rectifying circuit 41, to obtain a smoothed voltage V having a ripple. Examples of the capacitor 42 for smoothing the voltage includes a high-capacity electrolytic capacitor.

The DC/DC converting circuit 43 is a typical power device that converts the smoothed DC voltage V into a stable DC voltage D. Examples of the DC/DC converting circuit 43 include DHS series manufactured by COSEL Co., Ltd., EMR series manufactured by Artesyn Embedded Technologies, Inc., and CN-A series manufactured by TDK-Lambda Corporation. Specifically, the DC/DC converting circuit 43 includes a primary coil and a secondary coil that are connected to each other by magnetic coupling (not shown). The DC/DC converting circuit 43 is a switching power source that controls, based on a duty ratio (that is, a time ratio) that depends on the DC voltage D supplied from the power supply circuit 14, whether the smoothed DC voltage V is supplied to the primary coil. Switching a voltage supplied to the primary coil induces a voltage in the secondary coil. Accordingly, the above-mentioned DC voltage D is obtained by applying smoothing and rectifying to the induced voltage in the secondary coil. The detection circuit 44 shown in FIG. 2 includes a signal generating circuit 54. The constant voltage circuit 47 and a capacitor 48 generate a voltage by the DC voltage D output from the DC/DC converting circuit 43. The signal generating circuit 54 and the notification circuit 45 operate on the voltage generated by the constant voltage circuit 47 and a capacitor 48.

There is a case in which the supply of the power supply 200 is unstable due to the supplier of the power. In this case, the unstable supply of the power may cause a momentary sharp drop in AC voltage for various reasons. The detection circuit 44 shown in FIG. 2 detects a state in which the AC voltage A is lower than a threshold Vth continues for a given period of time. As shown in FIG. 2, the detection circuit 44 according to the embodiment includes a rectifying circuit 51, a voltage divider 52, and an optical coupler (referred to as "OPT" in the drawing) 53 in addition to the signal generating circuit 54 described above.

The rectifying circuit 51 rectifies the AC voltage A supplied from the power supply 200. For example, there may be used, as the rectifying circuit 51, a bridge-type full-wave rectifying circuit that full-wave rectifies the AC voltage A. The voltage divider 52 includes resistors. The voltage divider 52 divides, by a division ratio of k=R1/(R1+R2), a voltage rectified by the rectifying circuit 51, to obtain an index voltage Qa shown in FIG. 3. As a result, the index voltage Qa fluctuates repeatedly in a cycle $P_0$ corresponding to the half of that of the AC power source (e.g., 20 ms).

Figure 3:
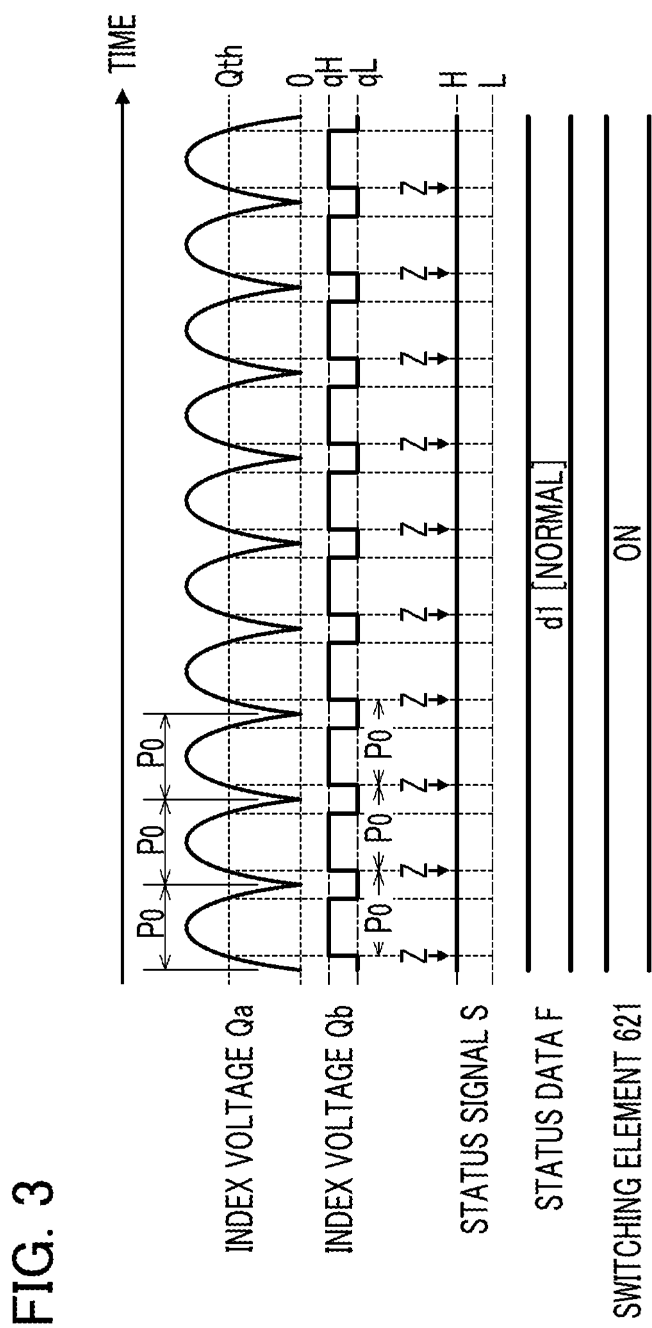
FIG. 3 is an illustrative diagram of operations of a detection circuit and a notification circuit in a normal state.

The optical coupler 53 shown in FIG. 2 generates an index voltage Qb corresponding to the index voltage Qa. The index voltage Qb has a binary voltage, which is obtained by binarizing the index voltage Qa. Specifically, as shown in FIG. 3, the index voltage Qb takes a value qH for a period during which the index voltage Qa exceeds a given threshold Qth. The index voltage Qb takes a value qL for a period during which the index voltage Qa is lower than the threshold Qth. The threshold Qth is not freely selectable because it depends on a characteristic value of the optical coupler 53.

However, a conversion threshold Vth, which is denoted by Vth=Qth/k and indicates a value before the division, is freely selectable by adjusting the division ratio k in the design stage. The value qH exceeds the value qL. As will be understood from the foregoing description, the index voltage Qb fluctuates repeatedly in the cycle $P_0$ that is the same as that of the index voltage Qa. In other words, the index voltage Qb fluctuates repeatedly in a period that is half of the AC voltage A. The threshold Vth may be set as follows. The audio system 100 is operable on a rated voltage ranging from 100V to 240V, for example. Then, the threshold Vth may be set to a value that is lower than a lower limit of the rated voltage, for example, 20V to 60V. The threshold Vth may be set a value lower than an optimal value, given that the threshold Qth of the optical coupler increases slowly by degradation over time.

The optical coupler 53 according to the embodiment includes a light emitter and light receiver (not shown). The light emitter emits for a period during which the index voltage Qa exceeds the threshold Qth. In contrast, the light emitter stops emitting for a period during which the index voltage Qa is lower than the threshold Qth. When the light receiver receives light from the light emitter, the light receiver generates the index voltage Qb depending on the amount of light from the light emitter. Specifically, the light receiver generates the index voltage Qb taking the value qH while the light emitter emits. The light receiver generates the index voltage Qb taking the value qL while the light emitter stops emitting.

Figure 4:
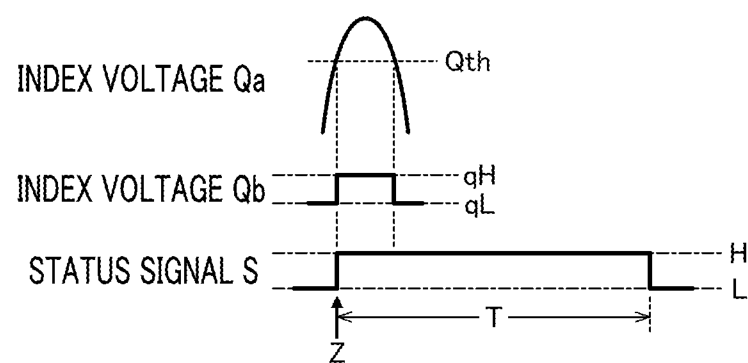
FIG. 4 is an illustrative diagram of an operation of a signal generating circuit.

The signal generating circuit 54 as shown FIG. 2 generates a status signal S representative of a voltage signal depending on the index voltage Qb. As shown in FIG. 4, the status signal S changes as follows. The status signal S is set to a high level for a period of time. This period begins at a time at which the index voltage Qb has changed from the value qL to the value qH, and continues until the end of a given period of time. Hereinafter, the time at which the index voltage Qb has changed from the value qL to the value qH will be called "changing point Z". The given period of time will be called "standby period T". The status signal S is set to a low level after the end of the standby period T. If a new changing point occurs within the standby period T, a new standby period begins at that new changing point. Accordingly, the period of the high level is extended from the new changing point to the end of the new standby period. The standby period T is set to a period (e.g., 40 ms) that is longer than the cycle $P_0$ of the index voltage Qa. In this case, the standby period T corresponds to four times longer than the cycle P0 of the index voltage Qa, that is, two cycles of the AC voltage A. The standby period T may be set to a value within a range from, for example, 3 times to 20 times longer than the cycle P0, given the capacitance of a capacitor at the output stage of the power supply circuit 14. If a voltage of that capacitor drops below a particular voltage level because the standby period T is excessively long, unpleasant noise in the audio signals cannot be prevented. The signal generating circuit 54 is configured as a general pulse generating circuit, examples of which include a general multi vibrator product such as 74HC123 manufactured by NXP Semiconductors.

The AC voltage A fluctuates in the range in which the audio system 100 is operable on the rated frequency and voltage. In such a state (hereinafter, referred to as "normal state"), as shown in FIG. 3, the peak of the index voltage Qa fluctuates such that it exceeds the threshold Qth over the cycle $P_0$. Accordingly, as for the index voltage Qb, one changing point Z comes after another changing point Z in the cycle $P_0$ that is shorter than the standby period T. Therefore, the status signal S is maintained to the high level in the normal state. In other words, the status signal S having the high level means the normal state.

Figure 5:
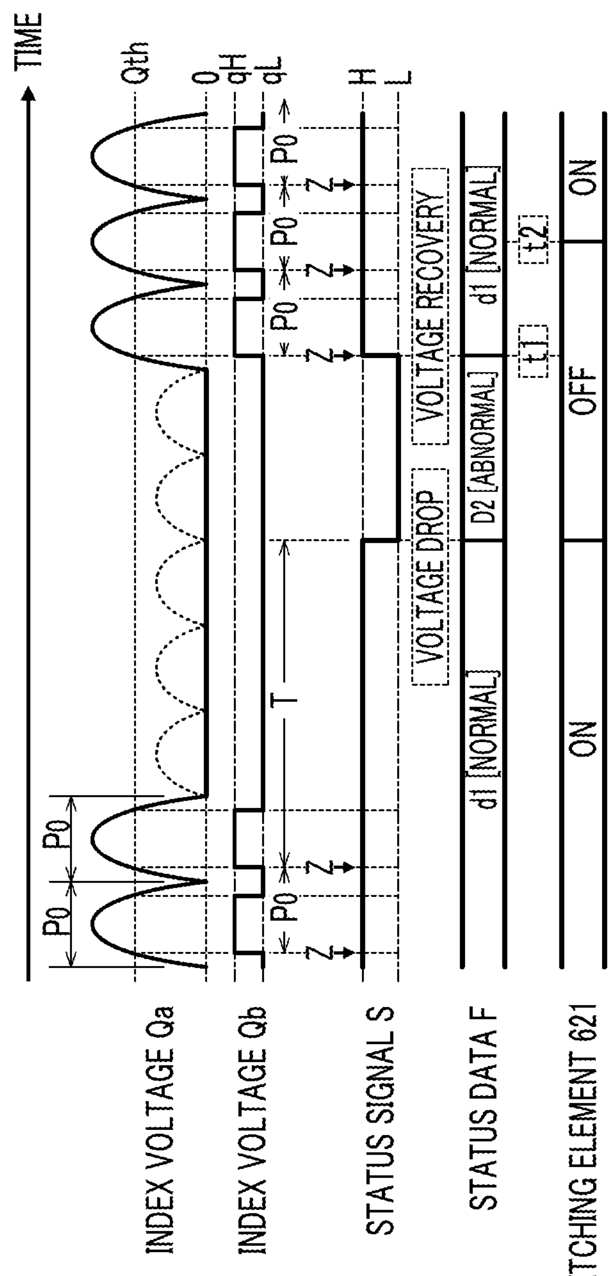
FIG. 5 is an illustrative diagram of operations of the detection circuit and the notification circuit in an abnormal state.

In contrast, in a state in which the AC voltage A drops significantly due to unstable power supply 200 for any of various reasons (hereinafter, referred to as an "abnormal state"), the index Qa cannot reach the threshold Qth. As shown in FIG. 5, for example, the abnormal state takes two different states as follows. One state is that the index voltage Qa fluctuates within a range smaller than the threshold Qth (broken lines). The other state is one in which the index voltage Qa does not fluctuate (solid lines). Suppose, after the power supply 200 changes from a normal state to an abnormal state, a standby period T passes without reaching the next changing point Z from the last changing point Z in the normal state. In this case, as shown in FIG. 5, the status signal S changes from a high level from a low level at a time at which the standby period T has passed from the last changing point Z. For example, in a configuration in which the standby period T corresponds to two periods of the AC voltage A, when the drop of the AC voltage A continues for two periods thereof, the status signal S changes from a high level to a low level. The status signal S having the low level indicates an abnormal state. A change of the status signal S from the high level to the low level means a sudden drop of AC voltage A. As will be understood from the foregoing description, the detection circuit 44 functions as an element that detects that the state continues for a given period of time (that is, the standby period T) in which the AC voltage A is lower than the threshold Vth.

If the detection circuit 44 receives a supply of the DC voltage from the constant voltage circuit 47, when the power supply 200 returns to normal, as shown in FIG. 5, the abnormal state changes to the normal state in which the changing points Z occur at every cycle P0. Accordingly, the status signal S changes to the high level at a first changing point Z after the power supply 200 returned to normal. After that, the status signal S is maintained at the high level. In other words, a change of the status signal S from a low level to a high level means recovery of the AC voltage A. That is, the change means that the power supply 200 returns to normal. In actuality, the constant voltage 47 has stopped a supply of the DC voltage in accordance with the control of the control processor 22 when the status signal S changed to the low level. Accordingly, the status signal S does not change to the high level until the constant voltage 47 restarts the supply of the DC voltage in accordance with the control of the control processor 22. As will be understood from the foregoing description, the detection circuit 44 also functions as an element that detects the recovery of the AC voltage A.

The notification circuit 45 shown in FIG. 2 notifies the audio processing device 16 of a status data F representative of a result of the detection (a drop of the AC voltage or a recovery thereof) by the detection circuit 44. The status data F is referenced by the control processor 22 in the audio processing device 16. The status data F is stored in the storage circuit 24. The status data F takes any one of a value d1 representative of the normal state, and a value d2 representative of the abnormal state.

Specifically, as shown in FIG. 5, when the status signal S has changed from a high level (that is, the normal state) to a low level (that is, the abnormal state), the notification circuit 45 changes the status data F from the value d1 (the normal state) to the value d2 (the abnormal state). In other words, the audio processing device 16 receives a notification regarding a drop of the AC voltage A. In contrast, when the status signal S has changed from a low level (that is, the abnormal state) to a high level (that is, the normal state), the notification circuit 45 changes the status data F from the value d2 (the abnormal state) to the value d1 (the normal state). In other words, the audio processing device 16 receives a notification regarding a recovery of the AC voltage from the power supply 200. As will be understood from the foregoing description, the notification circuit 45 notifies the audio processing device 16 of the drop of the AC voltage when the detection circuit 44 detects the drop of the AC voltage A. In contrast, the notification circuit 45 notifies the audio processing device 16 of the recovery of the AC voltage when the detection circuit 44 detects the recovery of the AC voltage A.

The audio processing device 16 obtains the audio signal Y by applying processing to the audio signal X. The audio processing device 16 stops or restarts the operation of outputting the audio signal Y to the sound outputter 18, depending on the notification from the notification circuit 45. Basically, the audio processing device 16 stops the above-mentioned operation when receiving a notification regarding a continuous voltage drop from the notification circuit 45. In contrast, the audio processing device 16 restarts the above-mentioned operation, only when both an output DC voltage of the power supply circuit 14 returns to a given DC voltage (e.g., the rated voltage of the power supply circuit 14) and the audio processing device 16 receives the notification regarding the recovery of the AC voltage from the notification circuit 45.

Figure 6:
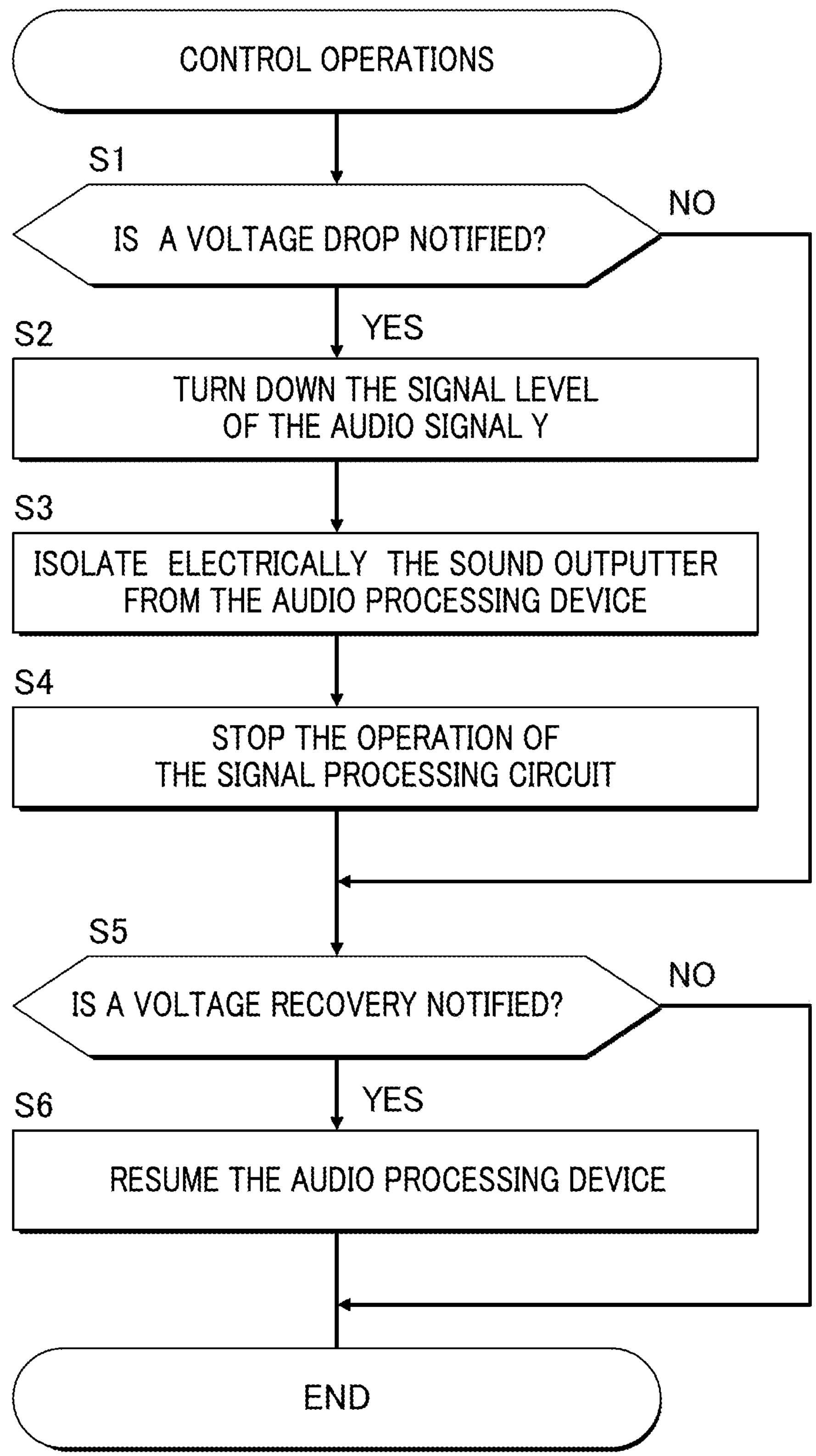
FIG. 6 is a flow chart showing a series of operations of a control processor.

Specifically, the control processor 22 performs control operations to stop or restart operation of the signal processing circuit 30, in accordance with notification from the notification circuit 45. FIG. 6 is a flowchart showing the control operations. The control processor 22 performs the control operations shown in FIG. 6 in accordance with the program stored in the storage circuit 24. The control processor 22 may start the control operations, responding to power-on of the audio system 100, after a given period of time. Alternatively, the control processor 22 may immediately start the control operations, responding to an interruption that occurs in a case in which the status data F changes. The control processor 22 may start the control operations for every given time, responding to a timer interrupt.

After the start of the control operations, the control processor 22 determines whether the notification regarding a continuous voltage drop is received from the notification circuit 45 (S1). In other words, the control processor 22 determines whether the status data F has changed from the value d1 to the value d2. When the control processor 22 receives the notification regarding the voltage drop (S1: YES), the control processor 22 turns down a signal level of the audio signal Y to be output to the sound outputter 18, by controlling the audio processing device 16 (S2). Specifically, the signal processor 32 in the signal processing circuit 30 reduces a coefficient, by which the signal processor 32 multiplies the audio signal X, to zero (that is, $-\infty$ dB) over time. This reduction in coefficient causes the control processor 22 to turn down the signal level of the audio signal Y, which is to be supplied to the sound outputter 18, to zero. In other words, an audio sound representative of the audio signal Y is muted. Accordingly, the embodiment enables the audio sound representative of the audio signal Y to be faded out before a user hears noise due to a sudden drop of the AC voltage A (that is, a sudden interruption of AC voltage).

After the signal level of the acoustic signal Y is sufficiently reduced, the control processor 22 controls the switch 35. As a result, the sound outputter 18 is electrically isolated from the audio processing device 16 (S3). In other words, the supply of current to the sound outputter 18 is turned off. After the sound outputter 18 is electrically isolated from the audio processing device 16, the control processor 22 causes the signal processing circuit 30 to stop the processing to which the audio signal is applied. At this time, if the control processor 22 has not received the notification regarding the voltage recovery from the notification circuit 45, the control processor 22 causes the constant voltage circuit 47 to stop the supply of the DC voltage to the detection circuit 44 and the notification circuit 45 (S4). Specifically, the control processor 22 stops the power amplifier 34, and then stops all of the signal processing circuit 30 including the signal processor 32. Accordingly, power consumption by the signal processing circuit 30 is reduced. On the other hand, when the control processor 22 does not receive the notification regarding the voltage drop from the notification circuit 45 (S1: NO), the control processor 22 stops operations of step S2 to step S4. Since the DC voltage D is supplied to the control processor 22 with priority over the other elements, even when the power supply 200 falls into an abnormal state, the control processor 22 can complete operations as shown in FIG. 6.

After that, the power supply 200 recovers from the abnormal state. As a result, the power supply 200 changes from the abnormal state to the normal state. In the audio processing device 16, first of all, the control unit 20 receives a supply of power (the DC voltage) and then starts. The control unit 20 causes the constant voltage circuit 47 to start to supply the DC voltage to the detection circuit 44 and the notification circuit 45. Then the control unit 20 detects whether the DC voltage is supplied to the signal processing circuit 30. After the control unit 20 has detected the supply of the DC power to the signal processing circuit 30, the signal processor 22 determines whether the notification regarding the voltage recovery is received from the notification circuit 45 (S5). In other words, the control processor 22 determines whether the status data F has changed from the value d2 to the value d1. When the signal processor 22 receives the notification regarding the voltage recovery (S5: YES), the control processor 22 causes the signal processing circuit 30 to restart the processing applied to the audio signal X in a state in which the output level of the audio signal Y is at mute level. Furthermore, the control processor 22 controls the switch 35, to electrically connect the sound outputter 18 to the audio processing device 16. Then the control processor 22 causes the signal processing circuit 30 to fade in the signal level of the audio signal Y (S6). In other words, the audio processing 16 returns to normal and obtains the audio signal Y by applying the processing to the audio signal X. The specific example of the control operation by the control processor 22 is described in the foregoing.

When the power supply 200 changes from an abnormal state to a normal state whereby the supply of the current to the power supply circuit 14 restarts, the following may occur. If the smoothed voltage V drops dramatically as compared with the effective voltage of the power supply 200, an instantaneous large current (inrush current) flows. This current may damage circuit elements such as the rectifying circuit 41 and the fuse 46. In the light of the abovementioned circumstances, the power supply circuit 14 according to the embodiment includes a protection circuit 60 that prevents damage to circuit elements from the inrush current. As shown in FIG. 2, a protection circuit 60 according to the embodiment includes a resistance element 61, a relay 62, an optical coupler 64 (referred to as "OPT" in the drawing) and a driving circuit 65.

As shown in FIG. 2, the protection circuit 60 has a first node N1 and a second node N2 between the power supply 200 and the rectifying circuit 41. Specifically, the first node N1 and the second node N2 are on a path to which the AC voltage applied in the protection circuit 60. The resistance element 61 is connected between the first node N1 and the second node N2. The relay 62 shown in FIG. 2 includes a switching element 621 and a coil 622. The switching element 621 is connected to the resistance element 61 in parallel. The switching element 621 is switched to the ON state (conductive state) or the OFF state (nonconductive state). When the switching element 621 is in the ON state, a short-circuiting connection between the first node N1 and the second node N2 is established. Conversely, when the switching element 621 is in the OFF state, the short-circuiting connection between the first node N1 and the second node N2 is not established. The coil 622 pulls a movable contact of the switching element 621 or pushes away the movable contact by electromagnetic force, whereby the switching element 621 is switched to the ON state or the OFF state. The resistance element 61 may have a value ranging from 3 ohms to 20 ohms, for example. The resistance element 61 may have maximum power consumption ranging from 3 watts to 20 watts, for example.

As mentioned above, the status signal S generated by the signal generating circuit 54 is supplied to the notification circuit 45. In addition, the status signal S is supplied to the driving circuit 65 via the optical coupler 64. The driving circuit 65 controls a supply of a current to the coil 622 depending on the status signal S from the optical coupler 64, to control the switching element 62 to be in the ON state or the OFF state. Specifically, when the status signal S has the high level in the normal state, the driving circuit 65 supplies the current to the coil 622, to control the switching element 621 to be in the ON state. In other words, the short-circuiting connection between the first node N1 and the second node N2 is established by the switch element 621. In contrast, when the status signal S has the low level in the abnormal state, the driving circuit 65 stops the supply of the current to the coil 622, to control the switching element to be in the OFF state. In other words, when the detection circuit 44 detects the continuous drop of the AC voltage A, the short-circuiting connection between the first node N1 and the second node N2 in not established. As a result, a current depending on the AC voltage runs to the resistance element 61.

There is time lag (e.g., 7 to 16 ms) from the start of the supply of the current to the coil 622 until the switching element 621 actually is switched to the ON state. As shown in FIG. 5, when the detection circuit 44 receives a supply of the AC current, and in turn the status signal S changes from the low level to the high level, the relay 63 is turned on by the driving circuit 65 at time t1. After that, the switching element 621 is actually switched to the ON state at time t2 further delayed from the time t1. The control of the control processor 22 causes the constant voltage circuit 47 to stop the supply of the DC voltage to the detection circuit 44 until the control processor 22 ends the detection of the supply of the DC voltage to the signal processing circuit 30. Accordingly, the switching element 621 is still in the OFF state immediately after the AC voltage A is recovered from the abnormal state. Therefore, the first node N1 is not directly connected to the second node N2 by the switch element 621. In other words, the short-circuiting connection between the first node N1 and the second node N2 is not established. After the recovery of the AC voltage A, currents begin to run to each of circuit elements (e.g., the rectifying circuit 41 and/or the fuse 46) in the power supply circuit 14. At this time, the resistance element 61 exists between the first node N1 and the second node N2. Accordingly, it is possible to prevent damage to the circuit elements from the inrush current. It is of note that the capacitor 42 holds sufficient charge at the timing at which the supply of the DC voltage to the signal processing circuit 30 has been detected. Accordingly, even if the short-circuiting connection between the first node N1 and the second node N2 is established by the switching element 621, the inrush current does not damage the circuit elements.

The switching element 621 switched to the ON state at time t2 delayed from time t1. The time t1 indicates a time at which the detection circuit receives the supply of the AC voltage and the AC voltage A is recovered. In other words, the short-circuiting connection between the first node N1 and the second node N2 is established by the switching element 621. As described above, the protection circuit 60 according to the embodiment establishes the short-circuiting connection between the first node N1 and the second node N2 after the supply of the DC voltage to the signal processing circuit 30 is detected. According to the embodiment, when the state in which the AC voltage A is lower than the threshold Vth continues, the first node N1 is not directly connected to the second node N2 by the switch element 621. Therefore, even when that state continues, it is possible to prevent damage to circuit elements from the inrush current after the AC voltage A is recovered. Furthermore, when the capacitor 42 holds sufficient charge, in other words, there is no risk of damage to the capacitor 42, the protection circuit 60 establishes the short-circuiting connection between the first node N1 and the second node N2 under the condition in which AC power is recovered. Accordingly, the signal processing circuit 30 is operable.

Modifications

The embodiments detailed above may be modified in various ways. Examples of specific modifications will now be described. Two or more modes selected freely among the following may also be combined.

(1) In the above-described aspect, the rising of the index voltage Qb, that is, the time at which the index voltage Qb raises from the value qL to the value qH is selected as the changing point Z. However, the dropping of the index voltage Qb, that is, the time at which the index voltage Qb drops from the value qH to the value qL may be selected as the changing point Z.

(2) The period of the standby period T is freely selectable. Even when the AC voltage drops temporally, as long as the period of the drop of the AC voltage is short enough, the DC voltage supplied to the signal processing circuit 30 still ranges within the operable voltage thereof. In this case, the audio processing device 16 may continue the operations (S2 to S4). Furthermore, the resistance element 61 may not be provided between the first node N1 and the second node N2. The standby period T is set as a criterion for "period that is short enough".

Accordingly, if the standby period T is excessively long, the DC voltage D, which is supplied to the signal processing circuit 30 from the power supply circuit 14, extremely drops for a period from an interruption of the supply of the AC voltage to the detection of the abnormal state by the detection circuit 44. The drop of the AC voltage may cause noise in the audio signal Y. The standby period T is set to a period that is short enough, given the maximum power consumption of the signal processing circuit 30.

(3) In the above-described aspect, the power supply circuit 14 is configured to include the detection circuit 44, the notification circuit 45 and the protection circuit 60. Any or all of the detection circuit 44, the notification circuit 45, and the protection circuit 60 may be separated from the power supply circuit 14.

(4) In the above-described aspect, the power supply circuit 14 is configured to include the notification circuit 45 and the protection circuit 60. The notification circuit 45 notifies the audio processing device 16 of the AC voltage drop. The protection circuit 60 disconnects the first node N1 to the second node N2 when the AC voltage drops. Any one of the power supply circuit 14 and the protection circuit 60 may be omitted. In this case, for example, the power supply circuit 14 may include the AC/DC converting circuit 40, the detection circuit 44 and the protection circuit 60. The AC/DC converting circuit 40 converts the AC voltage A into the DC voltage D. The detection circuit 44 detects the state in which a drop of the AC voltage A continues for the given period of time. The protection circuit 60 stops establishing the short-circuiting connection between the first node and the second node when the detection circuit 44 detects the continuous drop of the AC voltage A. In contrast, the protection circuit 60 establishes the short-circuiting connection between the first node N1 and the second node N2, when the DC voltage is recovered and further the detection circuit 44 detects the recovery of the AC voltage A.

For example, the following aspect is understood from the foregoing embodiments.

Aspect 1

A sound system according to a preferred aspect (aspect 1) of the present invention includes: an audio processing device; and a power supply circuit configured to supply a direct current voltage to the audio processing device, in which the power supply circuit includes: a converting circuit configured to convert an alternating current voltage into the DC voltage; a detection circuit configured to detect a state in which the AC voltage lower than a threshold continues for a given period of time; and a notification circuit configured to, when the detection circuit detects the state representative of an AC voltage drop, notify the audio processing device of the AC voltage drop, and in which, when the audio processing device receives a notification regarding the AC voltage drop, the audio processing turns down a signal level of an audio signal to be output. In the above aspect, when the detection circuit detects the state in which the AC voltage is lowered for the given period of time, the audio processing turns down a signal level of an output signal. Therefore, it is possible to suppress noise generated by the drop of the AC voltage.

Aspect 2

In a preferred example (aspect 2) according to aspect 1, the sound system includes: a signal processing circuit configured to apply a processing to the audio signal; and a control processor configured to control the signal processing circuit, and in which, when the control processor receives the notification regarding the AC voltage drop, the control processor causes the signal processing circuit to stop the processing. In the above aspect, when the control processor receives the notification regarding the AC voltage drop, the control processor causes the signal processing circuit to stop the processing. Therefore, it is possible to suppress noise without increasing load on the control processor.

Aspect 3

In a preferred example (aspect 3) according to aspect 2, the detection circuit detects a recovery of the AC voltage to the threshold or more, in which, when the detection circuit detects the recovery, the notification circuit notifies the audio processing device of the recovery, and in which, the audio processing device restarts the processing, only when both an output DC voltage of the power supply circuit returns to a given DC voltage and the audio processing device receives a notification regarding the recovery. The above aspect enables the processing circuit return to normal when there is no longer exists the state in which the AC voltage is lower than the threshold.

Aspect 4

The sound system according to a preferred example (aspect 4) of aspect 3 further includes a protection circuit configured to include a resistance element between a first node and a second node on a path to which the AC voltage is applied, in which, the protection circuit establishes a short-circuiting connection between the first node and the second node, only when both the output DC voltage of the power supply circuit returns to the given DC voltage and the detection circuit detects the recovery. In the above aspect, the resistance element is between the first node and the second node on the path to which the AC voltage is applied. When the AC voltage drops, the short-circuiting connection between the first node and the second node is not established. Therefore, it is possible to suppress an occurrence of an inrush current immediately after the AC voltage is recovered.

Aspect 5

A power supply according to a preferred aspect (aspect 5) of the present invention is a power supply circuit that supplies a direct current voltage to an audio processing device, the power supply circuit including: a converting circuit configured to convert an alternating current (AC) voltage into the DC voltage; a detection circuit configured to detect a state in which the AC voltage lower than a threshold continues for a given period of time; and a notification circuit configured to, when the detection circuit detects the state representative of an AC voltage drop, notify the audio processing device of the AC voltage drop. In the above aspect, when the detection circuit detects the state in which the AC voltage is lowered for the given period of time, the audio processing turns down a signal level of an output signal. Therefore, it is possible to suppress noise generated by the drop of the AC voltage.

Aspect 6

In a preferred example (aspect 6) according to aspect 5, the power supply includes a protection circuit configured to include a resistance element between a first node and a second node on a path to which the AC voltage is applied, in which the detection circuit detects a recovery of the AC voltage to the threshold or more, and in which when the detection circuit detects the recovery, the protection circuit establishes a short-circuiting connection between the first node and the second node. In the above aspect, the resistance element is between the first node and the second node on the path to which the AC voltage is applied. When the AC voltage drops, the short-circuiting connection between the first node and the second node is not established. Therefore, it is possible to suppress occurrence of inrush current immediately after the AC voltage is recovered.

DESCRIPTION OF REFERENCE SIGNS

100 Audio system
200 Power supply
12 Signal supply device
14 Power supply circuit
16 Audio processing device
18 Sound outputter
20 Control unit

22 Signal processor
24 Storage circuit
30 Signal processing circuit
31 A/D convertor
32 Signal processor
33 D/A convertor
34 Power amplifier
35 Switch
40 AC/DC converting circuit
41 Rectifying circuit
42 Capacitor
43 DC/DC converting circuit
44 Detection circuit
45 Notification circuit
46 Fuse
47 Constant voltage circuit
48 Capacitor
51 Rectifying circuit
52 Voltage divider
53 Optical coupler
54 Signal generating circuit
61 Resistance element
62 Relay
621 Switching element
622 Coil
64 Optical coupler
65 Driving circuit

What is claimed is:

1. A sound system comprising:

an audio processing device; and a power supply circuit configured to supply a direct current (DC) voltage to the audio processing device, wherein the power supply circuit comprises:

a converting circuit configured to convert an alternating current (AC) voltage into the DC voltage;

a detection circuit configured to detect a state representative of an AC voltage drop in which the AC voltage lower than a threshold continues for a given period of time; and a notification circuit configured to, in a case where the detection circuit detects the state representative of the AC voltage drop, notify the audio processing device of the AC voltage drop, wherein, in a case where the audio processing device receives a notification regarding the AC voltage drop, the audio processing device is configured to perform audio processing on an audio signal to be output to thereby turn down a signal level of the audio signal to be output, wherein the audio processing device includes (i) a signal processing circuit configured to perform the audio processing on the audio signal and (ii) a control processor configured to control the signal processing circuit, and after the signal processing circuit performs the audio processing on the audio signal to be output to thereby turn down the signal level of the audio signal to be output, the control processor causes the signal processing circuit to stop further audio signal processing, wherein the detection circuit is configured to detect a recovery of the AC voltage to the threshold or more, wherein, in a case where the detection circuit detects the recovery, the notification circuit notifies the audio processing device of the recovery, wherein the audio processing device restarts audio signal processing, only in a case where both an output DC voltage of the power supply circuit returns to a given DC voltage and the audio processing device receives a notification regarding the recovery, wherein the power supply circuit further comprises a protection circuit including a resistance element between a first node and a second node on a path to which the AC voltage is applied, and wherein the protection circuit establishes a short-circuiting connection between the first node and the second node, only in a case where both the output DC voltage of the power supply circuit returns to the given DC voltage and the detection circuit detects the recovery.

2. A power supply circuit that supplies a direct current (DC) voltage to an audio processing device, the power supply circuit comprising:

a converting circuit configured to convert an alternating current (AC) voltage into the DC voltage;

a detection circuit configured to detect a state representative of an AC voltage drop in which the AC voltage lower than a threshold continues for a given period of time;

a notification circuit configured to, in a case where the detection circuit detects the state representative of the AC voltage drop, notify the audio processing device of the AC voltage drop; and a protection circuit including a resistance element between a first node and a second node on a path to which the AC voltage is applied, wherein the detection circuit is configured to detect a recovery of the AC voltage to the threshold or more, and wherein, in a case where the detection circuit detects the recovery, the protection circuit establishes a short-circuiting connection between the first node and the second node.

* * * * *